United States Patent [19]
Benzoni et al.

[11] Patent Number: 5,337,398
[45] Date of Patent: Aug. 9, 1994

[54] SINGLE IN-LINE OPTICAL PACKAGE

[75] Inventors: Albert M. Benzoni, Lower Macungie Township, Lehigh County; Mindaugas F. Dautartas, Alburtis, both of Pa.

[73] Assignee: AT&T Bell Laboratories, Murray Hill, N.J.

[21] Appl. No.: 984,062

[22] Filed: Nov. 30, 1992

[51] Int. Cl.⁵ .................................... G02B 6/42
[52] U.S. Cl. ...................... 385/90; 385/52; 385/89; 385/93
[58] Field of Search .................. 385/49–52, 385/88–94, 14; 257/692, 723, 724, 730

[56] References Cited

U.S. PATENT DOCUMENTS

| | | | |
|---|---|---|---|
| 4,410,469 | 10/1983 | Katagiri et al. | 264/1.5 |
| 4,427,879 | 1/1984 | Becher et al. | 250/215 |
| 4,539,476 | 9/1985 | Donuma et al. | 250/227 |
| 4,625,333 | 11/1986 | Takezawa et al. | 455/612 |
| 4,647,148 | 3/1987 | Katagiri | 350/96.2 |
| 4,897,711 | 1/1990 | Blonder et al. | 385/88 X |
| 4,911,519 | 3/1990 | Burton et al. | 385/14 |
| 4,933,729 | 6/1990 | Soejima et al. | 257/724 X |
| 5,061,033 | 10/1991 | Richard | 385/92 |
| 5,113,466 | 5/1992 | Acarlar et al. | 385/88 |
| 5,123,066 | 6/1992 | Acarlar | 385/14 |
| 5,163,108 | 11/1992 | Armiento et al. | 385/89 |
| 5,179,609 | 1/1993 | Blonder et al. | 385/89 |
| 5,182,782 | 1/1993 | Tabasky et al. | 385/89 |
| 5,222,175 | 6/1993 | Tatoh | 385/93 |
| 5,249,245 | 9/1993 | Lebby et al. | 385/89 |
| 5,257,336 | 10/1993 | Dautartas | 385/93 |
| 5,259,054 | 11/1993 | Benzoni et al. | 385/89 |

Primary Examiner—John D. Lee
Attorney, Agent, or Firm—Wendy W. Koba

[57] ABSTRACT

An optical packaging arrangement is disclosed which utilizes silicon technology and overmolding techniques to provide a single in-line package with completely passive alignment between the various optical components. The technique as disclosed is useful in the packaging of a single active optical device and associated electronics, a pair of optical devices and electronics (transceiver), or an array of any desired number of such components. Since the silicon may be processed to include etched alignment fiducials and metallized bond pad sites, solder bump self-alignment and silicon optical bench technology may be used to provide for alignment between the active device, coupling lens and associated optical fiber.

13 Claims, 10 Drawing Sheets

SINGLE IN-LINE OPTICAL PACKAGE

BACKGROUND OF THE INVENTION

1. Technical Field

The present invention relates to a single in-line package (SIP) for optical systems and, more particularly, to a silicon-based SIP suitable for optical applications.

2. Description of the Prior Art

There exist many different arrangements for packaging optical communication arrangements. For example, an active optical device (e.g., laser, LED or photodiode) may be attached to a mount which is subsequently aligned with and attached to a base member, the base member including lensing elements to facilitate coupling of an optical fiber to the optical device. In most cases, the base member will include a spherical lensing element to maximize the optical coupling. The arrangement of the mounted optical device, base member and lens is often referred to in the art as an optical subassembly, or OSA. The electronics required for operating the optical device (a driver circuit for a transmitter, or an amplification and decision circuit for a receiver, for example) may then be separately assembled (on a printed wiring board, for example) and connected to the optical subassembly by conventional electrical leads. Alternatively, the electronics may be fully enclosed in a separate housing, with only the leads exposed for connection to the optical subassembly. An advantage of using separate housings for the electronics and optics relates to the ability to interchange the components as required for different applications. For example, a data link application may operate with TTL electronic signals, and another application (with the same optics) may utilize ECL electronic signals. Additionally, if either the electrical or optical portion of an arrangement were to experience a failure, the working portion could be disconnected and re-used with another arrangement. A major disadvantage of separate packaging is the overall size of the resultant arrangement. With two separate packages, or an optical package mounted on a printed wiring board, the arrangement requires a relatively large space. Further, such an arrangement is susceptible to electrical noise introduced by the necessarily long lead lengths between the electronics and the optical device. The electrical noise factor becomes a significant concern at bit rate exceeding approximately 10 Mb/s. Also, long leads may limit the maximum bit rate of either a transmitter or receiver, due to parasitic lead inductance (limits transmitter) or parasitic capacitances (limits receiver).

These and other concerns have led to the development of package designs which provide for the electronics and optical device to be housed in the same unit. Many of these unitary packages are relatively expensive, as a result of using a hybrid integrated circuit (HIC) arrangement for the electronics, with an optical subassembly attached to the HIC. Additionally, the piece parts used in the optical subassembly associated with these packages are often formed of machined metallic components, adding to the cost of the system. Further, these optical subassemblies have been known to experience active alignment difficulties. Fabrication problems may also exist with respect to mating the various piece parts (i.e., outer housing, optical subassembly, and HIC). Lastly, in many instances, the package processes for transmitter and receiver are often very distinct, leading to manufacturing problems and increasing the overall expense of the packaged system.

An improved package design is disclosed in U.S. Pat. No. 4,911,519 issued to W. H. Burton et al. on Mar. 27, 1990. In the disclosed arrangement, the HIC of a conventional package is replaced by a conventional 16-pin dual-in-line package (DIP) which includes a specialized pair of end prong leads for attachment to the optical subassembly. The DIP and optical subassembly are subsequently assembled within a plastic molded package frame. The plastic molded frame is configured to include a molded optical connector receptacle for subsequent attachment of a connectorized optical fiber. The arrangement is subsequently covered with a metallic lid which is electrically grounded to the package floor. A significant savings is realized by the utilization of the DIP, as well as the molded plastic piece part of the frame/connector assembly.

Although the Burton et al. arrangement is considered to be a significant advance over the prior art, the need remains to further simplify optical packaging techniques, with respect to limiting the number of separate assembly operations and, ultimately, eliminating the need to perform active optical alignment between components.

SUMMARY OF THE INVENTION

The need remaining in the prior art is addressed by the present invention which relates to a single in-line package (SIP) for optical systems and, more particularly, to a silicon-based SIP suitable for optical applications.

In accordance with an exemplary embodiment of the present invention, a silicon substrate is utilized as the supporting member of the package, with all necessary electrical leads/bond pads formed along one edge of the substrate's top surface. The integrated circuits (drivers, amplifiers) required for operation of the optical device(s) are mounted directly on the substrate, which is metallized to include necessary runners to the leads. The integrated circuits and optical devices are attached to precise locations on the silicon utilizing solder bump self-alignment technology. Various alignment features (e.g., pyramidal detents) are etched in the silicon top surface at predetermined locations with respect to the devices to provide for attachment and alignment of the remainder of the optical subassembly (lens and fiber receptacle). The populated silicon substrate, including the attached lens and fiber receptacle, may then be overmolded to provide the final package.

An advantage of the SIP arrangement of the present invention is the completely passive alignment of the various components forming the optical assembly, provided as a result of utilizing silicon as the base material for the package. In particular, the ability to simultaneously achieve precision alignment and electrical connectivity of both the electronic and optic devices on the substrate (and therefore use only one solder re-flow operation) represents a significant saving to the manufacturing process. Further, the entire populated substrate may then be tested to determine the operation of the complete unit.

Another advantage of utilizing silicon is the ability to provide for good thermal dissipation from the integrated circuits mounted on the substrate. Further, the utilization of active optical devices with both n- and p-contacts on the same surface ("flip-chip") eliminates the need for any wire bonding operations (which may cause device damage and/or necessitate further testing).

Since silicon processing technology is relatively well-known, the techniques as outlined above may easily be expanded to form any number of desired metallizations and alignment features such that any number of optical devices may be mounted on a single silicon substrate. For example, the techniques of the present invention may be used to form a SIP transceiver (transmitter and receiver in same package) or, an array of any desired number of transmitters and/or receivers. Alternatively, a large number of separate optical assemblies may be "batch" (i.e., simultaneously) processed on a single silicon wafer, the wafer being diced into separate substrates prior to the final overmolding operation.

Other and further advantages of the present invention will become apparent during the following discussion and by reference to the accompanying drawings.

BRIEF DESCRIPTION OF THE DRAWING

Referring now to the drawings, where like numerals represent like piece parts in several views.

DETAILED DESCRIPTION

Figure 1:
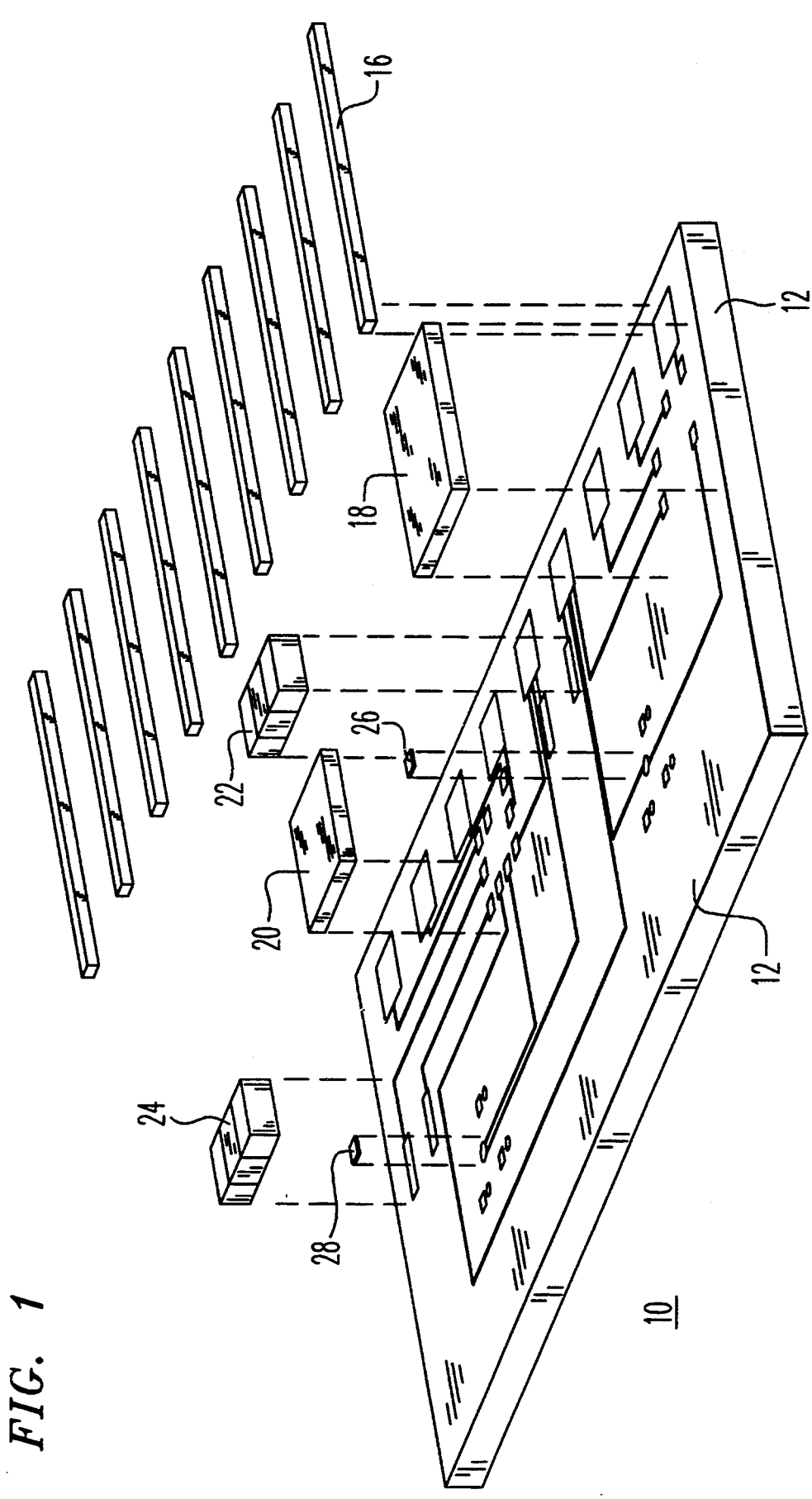
FIG. 1 contains an exploded view of an exemplary optoelectronic circuit with a single in-line package (SIP) pinout, showing the location of various electrical and optical components with respect to the silicon substrate.

FIG. 1 illustrates, in an exploded view, an exemplary partially processed optical assembly 10 based upon a silicon substrate 12, showing a number of the electrical and optical components which are used to populate substrate 12 and form an optical transceiver. It is to be noted that while the following discussion will focus on the assembly of an exemplary transceiver structure, the techniques of the present invention are suitable to various optical package arrangements including, but not limited to, packages for single optical devices (transmitters or receivers) or, alternatively, packages for an array of optical devices and associated electronics. Referring back to FIG. 1, assembly 10 includes a silicon substrate 12 (processed to include a dielectric (e.g., $SiO_2$) surface) which has been metallized (using a conventional metallization such as gold, or a tri-layer structure of Ti-Pt-Au), the metallization pattern defined by standard photolithographic procedures well-known in the silicon processing art. As shown, the metallization is formed to provide a plurality of bond pad sites 14 along one edge of the top surface 13 of substrate 12, bond pad sites 14 being used to provide for the attachment of a plurality of leads 16 from a leadframe. Various metallized paths (clearly illustrated in the following FIG. 2) are also patterned and formed during the metallization process and utilized as discussed in detail below to interconnect the various electrical and optical components. For the exemplary transceiver embodiment of FIG. 1, a transmitter circuit 18 and receiver circuit 20 are shown as positioned on top surface 13 of substrate 12. As will be discussed in detail hereinbelow, circuits 18 and 20 are attached utilizing "flip-chip" technology, which removes the need for any wire bond attachments (reducing capacitance problems and improving thermal dissipation). A de-coupling capacitor 22 (for electrically isolating transmitter circuit 18 from receiver circuit 20) and bypass capacitor 24 (associated with the responsivity of receiver circuit 20) may also be utilized and are illustrated in FIG. 1. Alternatively, such passive components may be formed directly on the silicon substrate. An advantage of the utilization of a silicon substrate, as mentioned above, is the ability of silicon to transport the heat generated by circuits 18 and 20 away from the heat-generating optical devices. The utilization of silicon as the substrate material also serves to spread the heat in a uniform manner, when compared to the thermal transport properties of a copper leadframe, as used with some prior art optical packages. Also, the utilization of silicon allows for a better match (in terms of thermal expansion) with the electronic circuits (silicon-based) and with the optical devices to be described below.

Also illustrated in FIG. 1 are the optical components necessary to form an exemplary transceiver; an optical transmitting device 26 (for example, an LED) and an optical receiving device 28 (for example, a photodiode). As will be described in detail hereinbelow, the location of these optical devices 26, 28 with respect to substrate 12 may be controlled through well-known solder bump self-alignment techniques.

Figure 2:
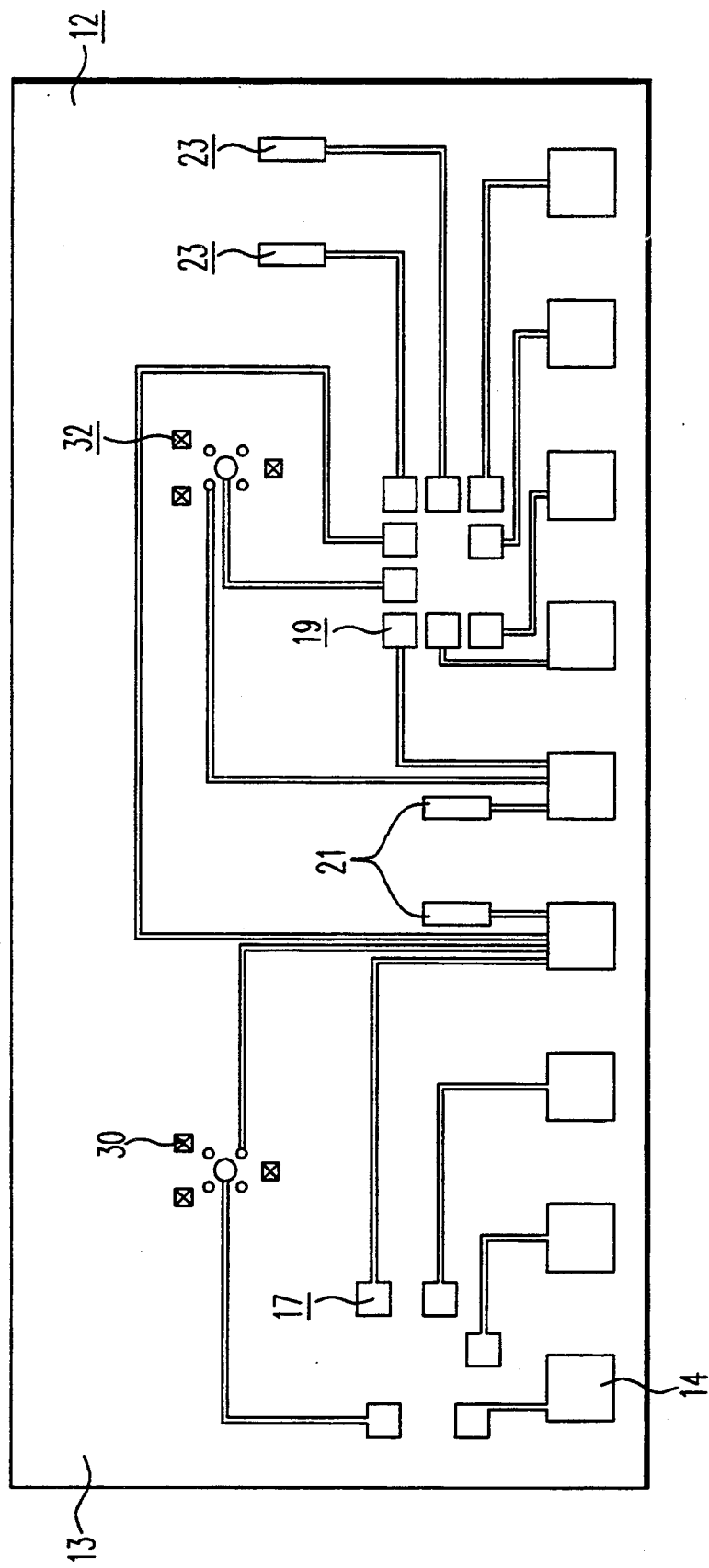
FIG. 2 illustrates an exemplary silicon substrate utilized in a SIP of the present invention, showing in particular the various bond pad site locations.

FIG. 2 illustrates, in a top view, substrate 12 after the processing to provide the desired metallizations. As shown, the plurality of bond pads 14 are formed along one edge of top surface 13 of substrate 12. Also shown in this view is a plurality of bond pad sites 17 which will provide the necessary electrical contacts (i.e., power and data) to the underside of transmitter 18 (not shown in this view). A plurality of bond pad sites 19 provide the necessary underside electrical contacts to receiver circuit 20. As mentioned above, the use of underside contacts (referred to as "flip-chip" bonding) thus removes the necessity to perform wirebonding operations in assembling the package of the present invention. Also shown are the bond pad sites 21 and 23 for capacitors 22 and 24, respectively (if such discrete components are required). The metallic lead lines (not numbered) and bond pad sites utilized to couple the optical devices (not shown) to the electrical devices are also illustrated in this view.

Figure 3:
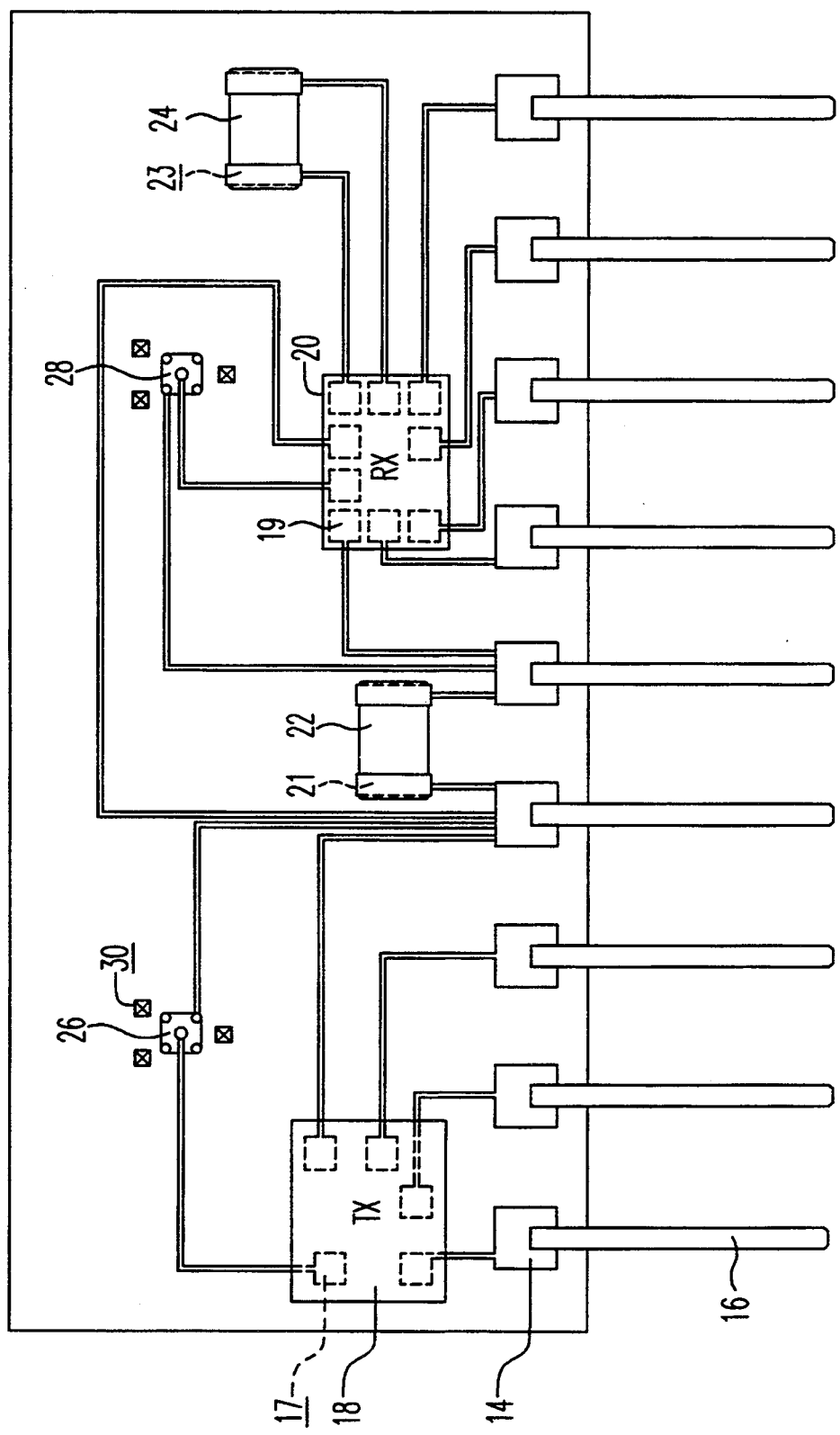
FIG. 3 contains a top view of an exemplary substrate, subsequent to metallization and placement of integrated circuits and active optical devices.

FIG. 3 illustrates, in a top view, an exemplary substrate 12 after attachment of the various components discussed above. The bond pad sites discussed above in FIG. 2 are illustrated in phantom in FIG. 3. In general, after the process of metallizing substrate 12 as discussed above, a suitable bonding material (such as Au/Sn) is disposed over the bond pad sites. The components are then placed on substrate 12 (using a conventional pick-and-place tool, for example). Substrate 12 is then heated to a temperature sufficient to melt the bonding material, which subsequently liquifies (i.e., re-flows). Electrical devices 18, 20 and optical devices 26, 28, when contacted to the liquified solder material, will naturally center over the pattern of the bond pad site, as a result of the surface tension created, and thus be self-aligned to the underlying bond pad sites. Therefore, a single step solder re-flow process may be used to provide simultaneous attachment of all necessary components (electrical and optical) to substrate 12. The self-aligned benefit of this process, therefore, is that the locations of optical devices 26 and 28 may be controlled by the manufacturing process of the SIP optical arrangement of the present invention. A particular solder suitable for such self-alignment purposes, as well as a more complete description of the self-alignment process, can be found in co-pending application Ser. No. 877,355 assigned to the assignee of the present application and herein incorporated by reference. The ability to utilize a single solder re-flow to simultaneously attach both the electrical and optical components also results in the ability to immediately test the viability of the final product, where this testing capability is extremely useful in the manufacturing process.

As mentioned above, an additional benefit of utilizing silicon is the ability to etch the material to form any desired number and pattern of alignment fiducials. The formation of such alignment fiducials may occur before or after metallization and is of no concern in practicing the techniques of the present invention. Referring to FIGS. 1–3, a plurality of alignment fiducials, denoted 30 and 32, may be etched in top surface 13 of substrate 12 in the vicinity of optical devices 26 and 28, respectively. Alignment fiducials 30, 32 are used, as described in detail below, to provide alignment of the remaining optical components (lens, fiber ferrule receptacle) to active devices 26 and 28.

Figure 4:
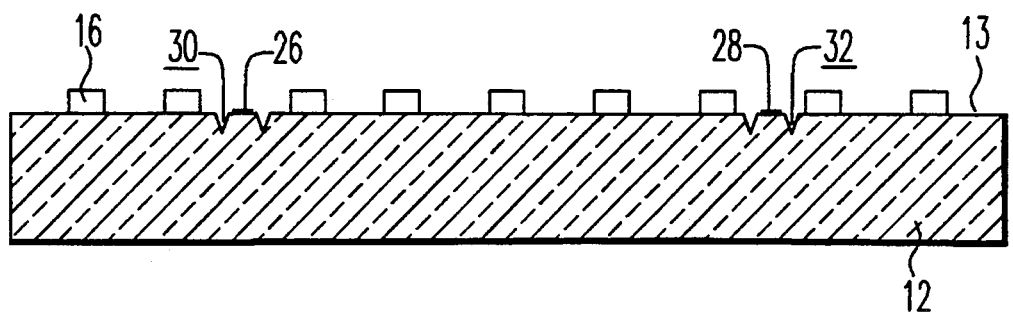
FIG. 4 is a cut-away side view of the arrangement of FIG. 3.

FIG. 4 contains a cut-away side view of the arrangement of FIG. 3, illustrating in particular the location of leads 16 and the formation of fiducials 30, 32 in top surface 13 of silicon substrate 12. The location of optical devices 26 and 28 is also shown in this view. Not evident in this particular view are electronic circuits 18 and 20, or capacitors 22 and 24, which are omitted only for the sake of clarity.

Figure 5:
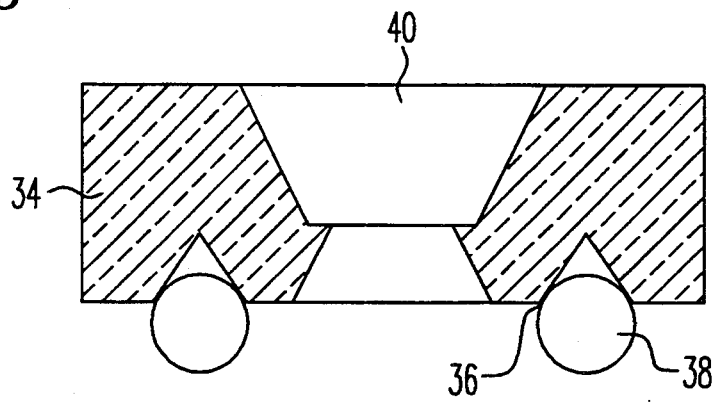
FIG. 5 illustrates an exemplary lens holder suitable for utilization with the arrangement of FIG. 1.
Figure 6:
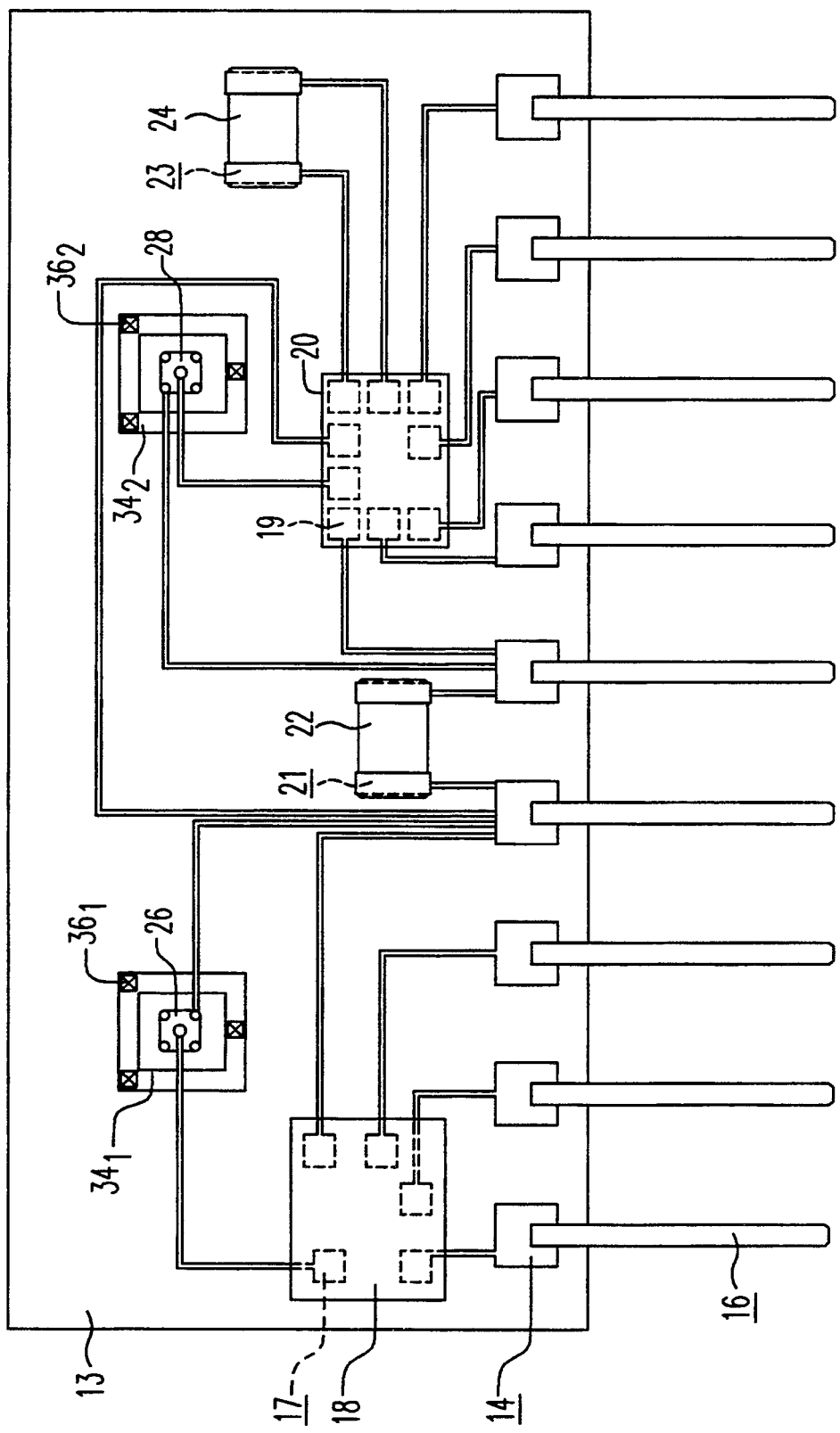
FIG. 6 contains a top view of an exemplary transceiver SIP after attachment of the lens holder of FIG. 5.

Subsequent to the solder bump self-alignment of electrical devices 18, 20 and optical devices 26, 28 to silicon substrate 12, the remaining optical components may be attached to substrate 12. By virtue of the formation of fiducials 30, 32, these remaining components will be self-aligned to the underlying optical devices 26, 28, thus providing an optical package which requires no active alignment of the various optical components. FIG. 5 illustrates an exemplary lens holder 34 which may be utilized in the assembly of an exemplary SIP arrangement of the present invention. In a preferred embodiment, lens holder 34 comprises a silicon piece part. As shown, lens holder 34 contains a plurality of alignment fiducials 36 which correspond to a like number of alignment fiducials (either 30 or 32) formed on surface 13 of substrate 12. A plurality of spherical members 38 are illustrated as inserted in fiducials 36 and used to provide physical contact to, and mating with, fiducials 30 or 32 of silicon substrate 12. FIG. 6 contains a top view of an exemplary SIP assembly including a pair of lens holders $34_1$ and $34_2$ attached to top surface 13 of substrate 12 by mating of associated fiducials $36_1$ to 30 and $36_2$ to 32. The locations of active devices 26 and 28 is clearly visible through apertures 40 formed in lens holders 34.

Figure 7:
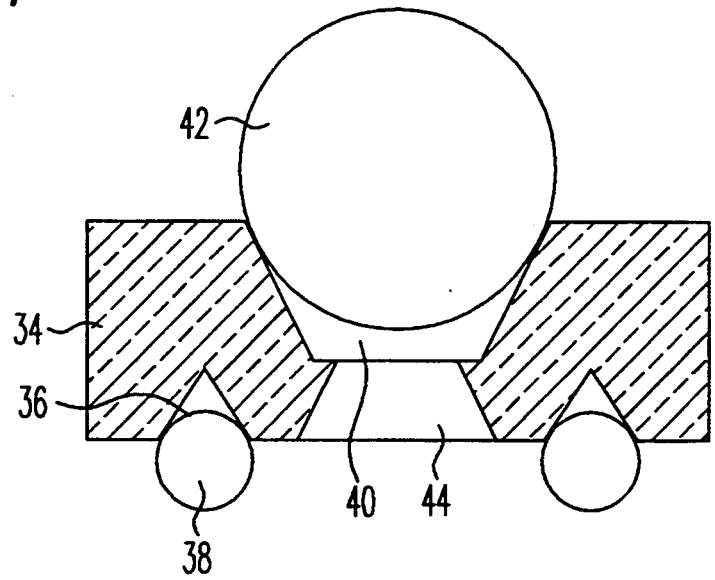
FIG. 7 illustrates an exemplary lens holder and lens suitable for utilization with the arrangement of FIG. 1.
Figure 8:
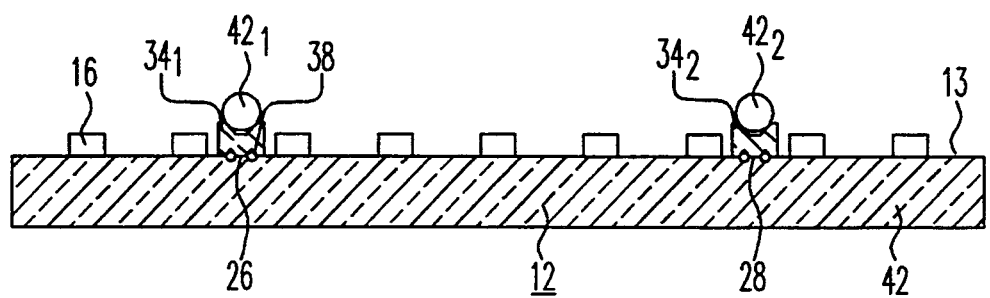
FIG. 8 is a cut-away side view of an exemplary transceiver SIP after attachment of the lens as shown in FIG. 7.
Figure 9:
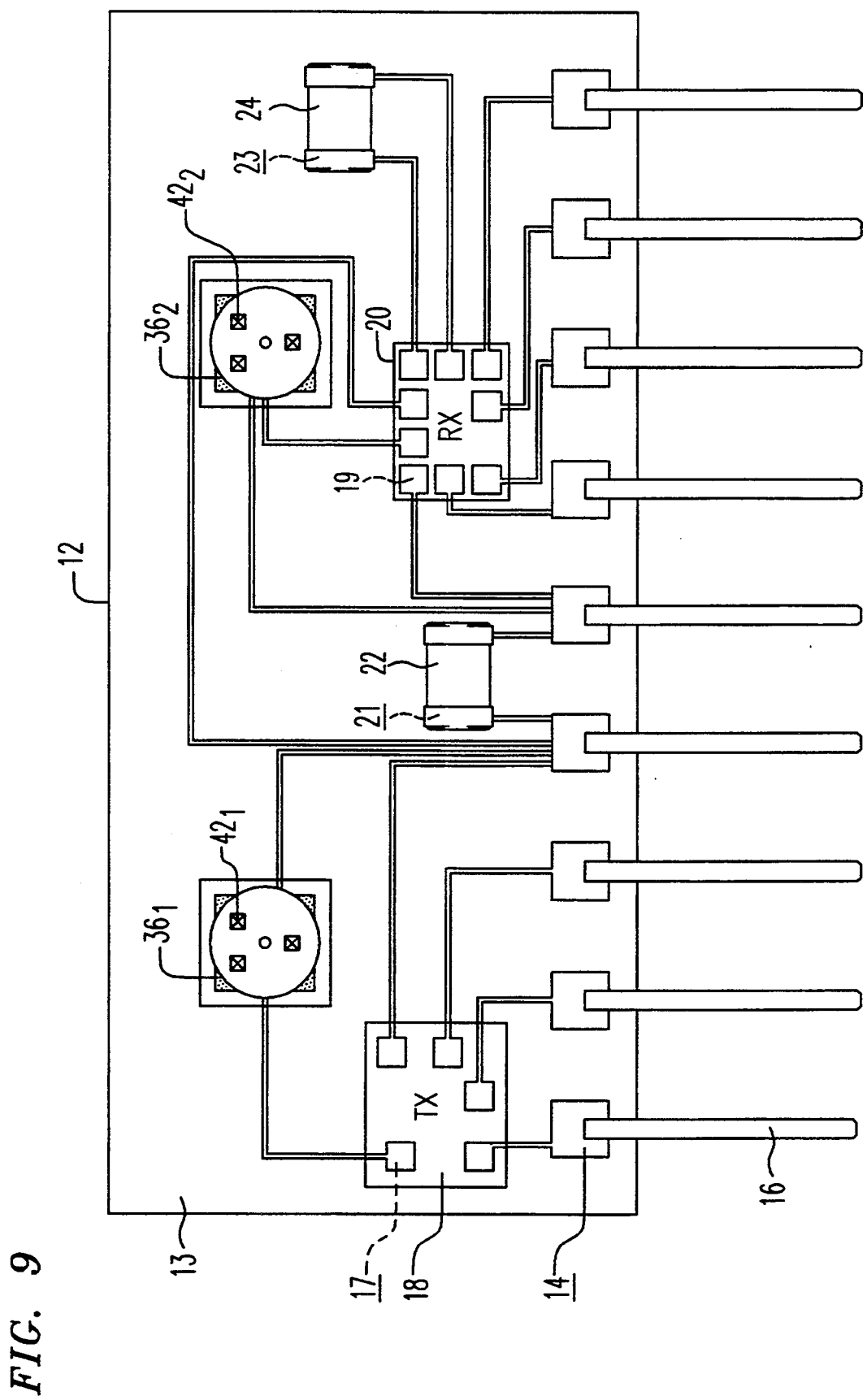
FIG. 9 is a top view of the arrangement of FIG. 8.

As mentioned above, the ability to control the formation and location of the alignment fiducials results in passive alignment of lens holder 34 to devices 26, 28 when the lens holders are attached to the silicon surface. Therefore, a lens 42 supported by lens holder 34 in the manner illustrated in FIG. 7 will also be aligned to the underlying optical device (26 or 28) when placed in aperture 40 of lens holder 34. Therefore, the need to actively align lens 42 to the underlying optical device is removed by the design of the present invention. FIG. 8 illustrates a cut-away side view of the exemplary assembly of FIG. 6 (without the associated electrical components) including a pair of lenses $42_1$ and $42_2$ supported by the associated lens holders $34_1$ and $34_2$, respectively. A smaller aperture 44, formed underneath lens 42 and clearly depicted in FIG. 7 is used to accommodate the underlying optical device 26 or 28 and provide a clear optical path between the optical device and lens. It is to be understood that if lens holder 34 is formed of silicon, fiducials 36 and apertures 40, 44 may be formed using well-known silicon etching techniques. FIG. 9 contains a top view of an exemplary SIP assembly, including lenses 42 supported by lens holders 34.

Figure 10:
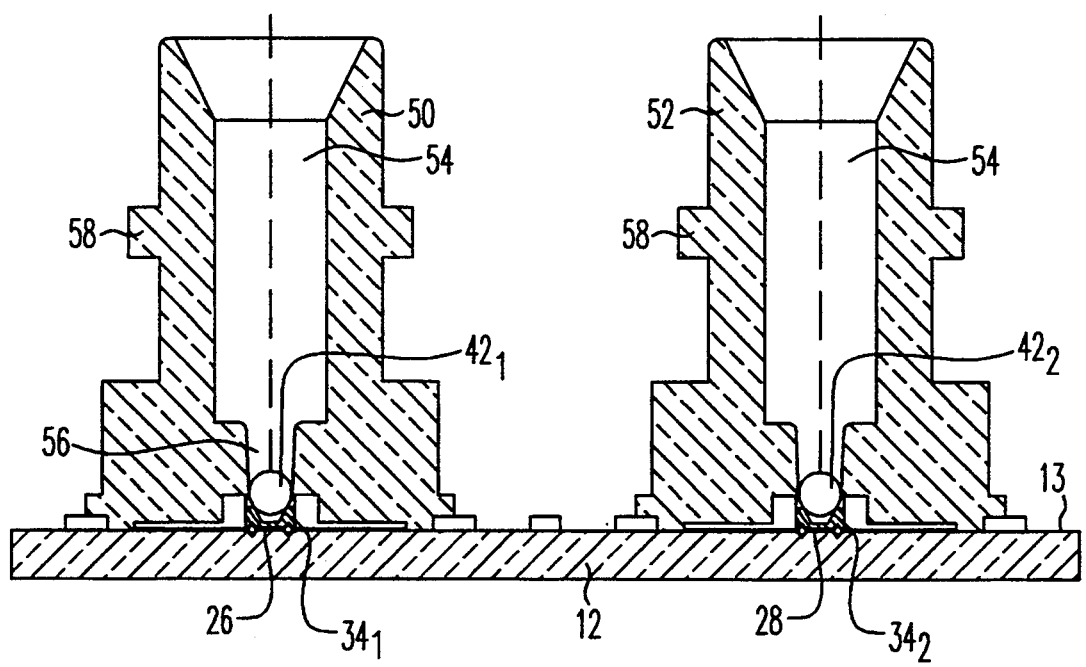
FIG. 10 is a cut-away side view of an exemplary transceiver SIP after the attachment of a pair of optical fiber ferrule receptacles.
Figure 11:
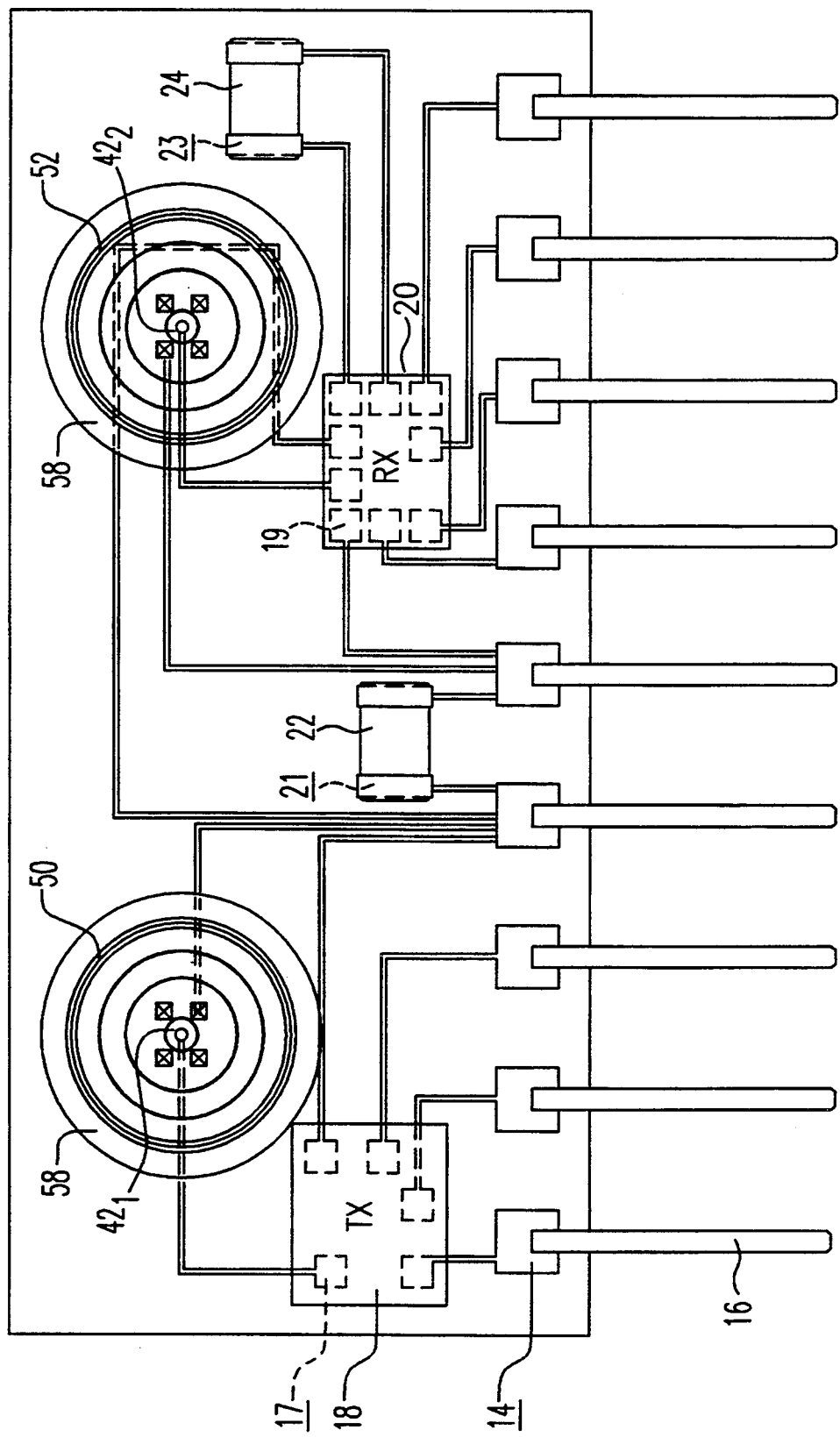
FIG. 11 is a top view of the arrangement of FIG. 10.

After placement of lenses 42, a pair of optical fiber ferrule receptacles 50 and 52 are positioned over the aligned optical components (lens and active device). FIG. 10 contains a cut-away side view of an exemplary arrangement with ferrule receptacle 50 positioned over active device 26 and lens $42_1$ and ferrule receptacle 52 positioned over active device 28 and lens $42_2$. Each ferrule receptacle includes an axial bore 54 for later placement of an optical fiber ferrule (which includes the optical fiber). A narrowed region 56 of bore 54 functions as a mechanical stop for the fiber ferrule, as well as to capture the associated lens 42, which aligns the ferrule receptacle to the lens and, therefore, to the underlying optics (see Ser. No. 926,555, filed Aug. 6, 1992, entitled "Optical Fiber Ferrule Assembly" and assigned to the assignee of the present application for a thorough discussion of fiber ferrule alignment). An alignment flange 58 is formed to surround each ferrule receptacle 50, 52, as shown in FIG. 10. As will be described hereinbelow, flange 58 is utilized to align a connector assembly to each ferrule receptacle 50, 52. Therefore, as result of the various passive alignment steps discussed above and used in the assembly of the inventive package, a fiber ferrule (not shown) inserted into a ferrule receptacle (50 or 52) will be automatically aligned with both lens 34 and the active device (26 or 28). FIG. 11 contains a top view of an exemplary SIP assembly with mounted ferrule receptacles 50, 52. Ferrule receptacles 50, 52 may be attached to surface 13 of substrate 12 by providing metallized surfaces which can be heat treated to provide attachment. However, since the next step in the process is to overmold the arrangement, temporary attachment (tacking) of ferrule receptacles 50, 52 to substrate 12 is sufficient.

It is to be understood that the optical assembly described above including the lens holder, lens and ferrule receptacle is exemplary only. In some cases, for example, a lensed fiber may be used in place of (or in addition to) a separate coupling lens. Further, the ferrule receptacle as described above may be modified to incorporate the alignment fiducials directly and support the coupling lens (if any), removing the need for a separate lens holder piece part. In general, any arrangement suitable for supporting an optical fiber and providing passive alignment between the fiber and underlying active optical device is suitable for use in the arrangement of the present invention.

Figure 12:
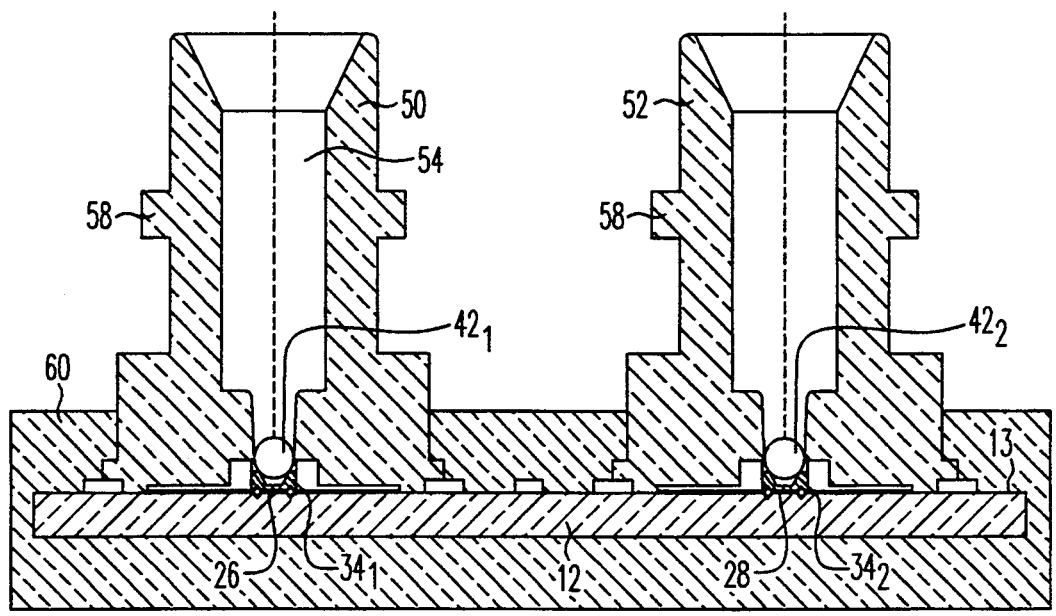
FIG. 12 is a cut-away side view of an exemplary transceiver SIP after the overmolded outer package is formed.
Figure 13:
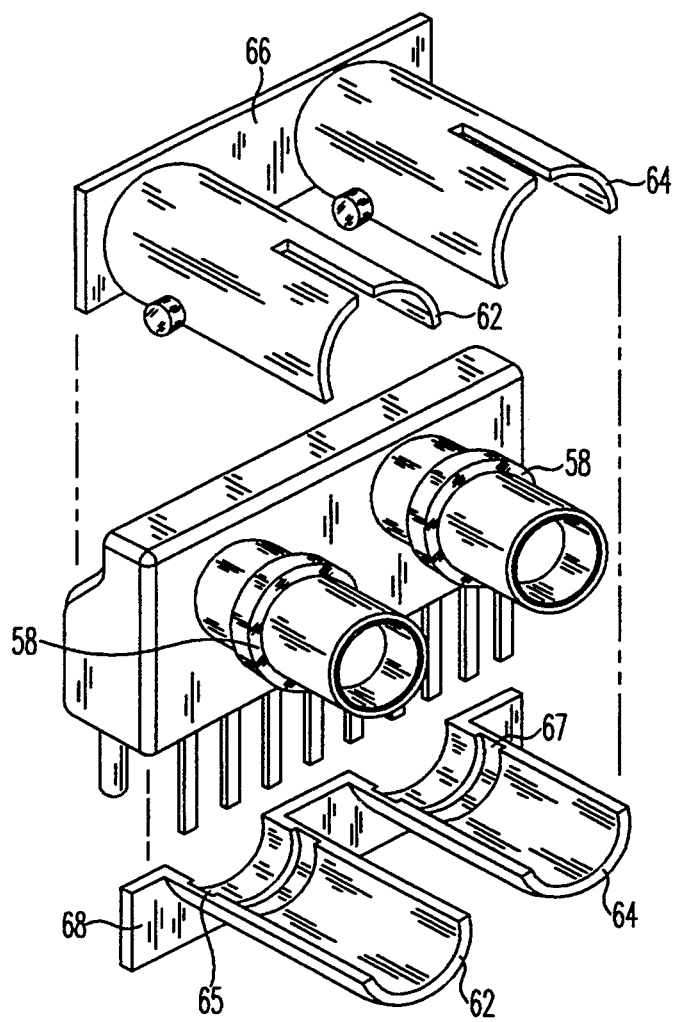
FIG. 13 contains a perspective view of an exemplary SIP package subsequent to molding.

The assembly as described above may be subsequently overmolded to provide the final packaged optical arrangement. FIG. 12 illustrates an exemplary SIP assembly which includes such an overmolded outer package 60. Package 60 may be formed of a material such as a thermoset plastic (which may be transfer molded) or a liquid crystal polymer material (which may be injection molded) to provide the final package as shown. The molding process may be accomplished such that substrate 12 and the bottom portions of ferrule receptacles 50 and 52 are completely encapsulated. An exploded view of the final assembly is illustrated in FIG. 13, which illustrates the position of leads 16 as they exit package 60. Also shown is the protrusion of ferrule receptacles 50, 52 from molded package 60 such that flanges 58 are not covered by the overmolding compound. Flanges 58 may then be used, as shown in FIG. 13, to provide mechanical attachment and optical alignment of fiber connector receptacles 62, 64. In one embodiment, connector receptacles 62, 64 may simply comprise plastic piece parts 66, 68 which fit over ferrule receptacles 50, 52, such that indented portions 65, 67 mate with flanges 58.

Figure 14:
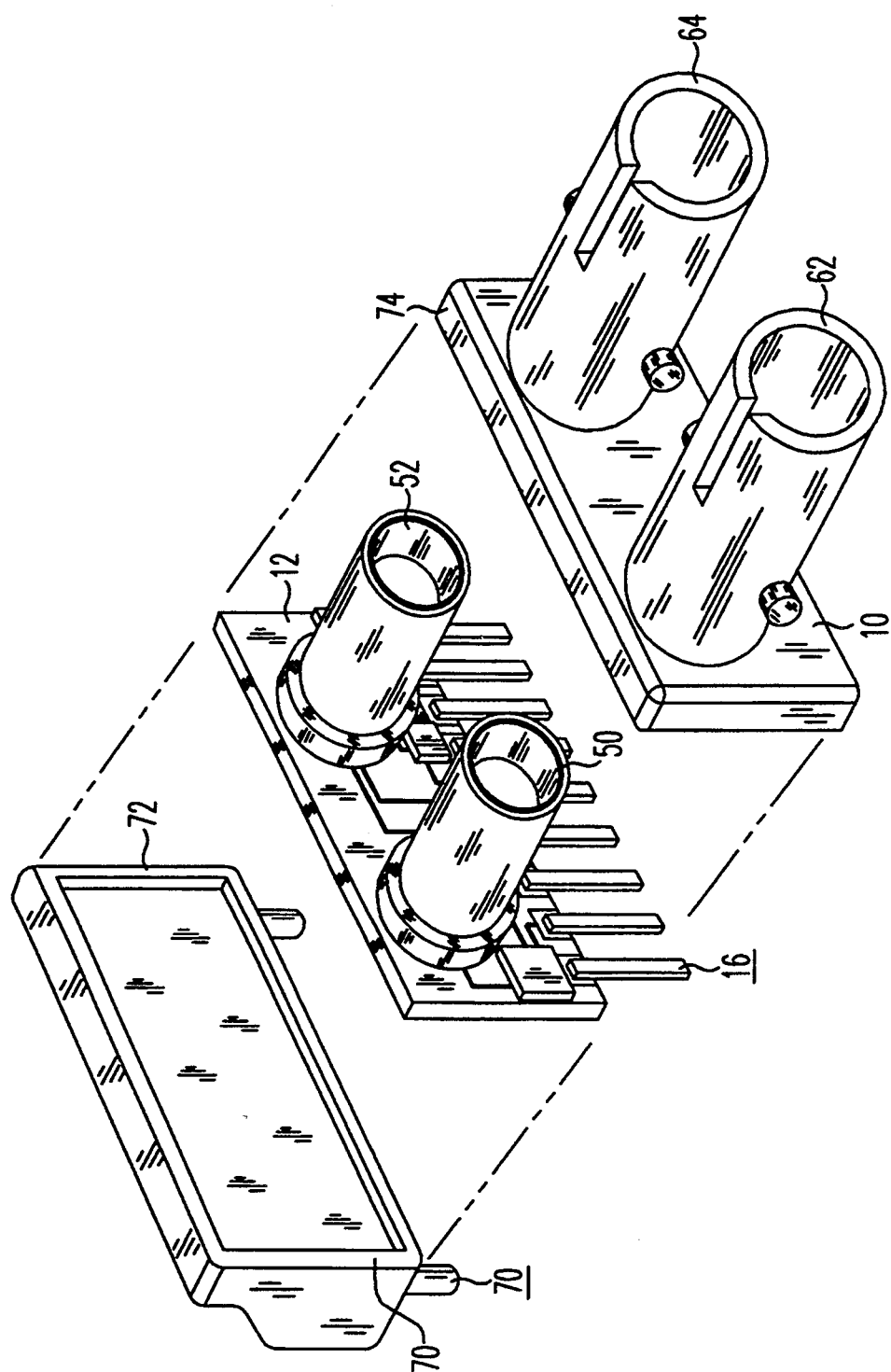
FIG. 14 contains a view of an exemplary SIP transceiver, including a two-piece, clam-shell outer package.

Alternatively, package 60 may be molded so as to incorporate connector receptacles 62, 64. A two-piece clam-shell package may also be used, with a first piece supporting silicon substrate 12 and a second piece containing the necessary receptacles. For example, the arrangement as illustrated in FIG. 14 may comprise a two-piece outer package 70 with a first shell piece 72 supporting silicon substrate 12 and a second shell piece 74 formed to include connector receptacles 62, 64. In this arrangement, second shell piece 74 slides over the outer diameter of ferrule receptacles 50, 52 and mates with top surface 73 of first shell piece 72. Surface 73 is thus used as the reference surface in this embodiment. Shell pieces 72 and 74 may comprise metal-plated plastic piece parts (either single- or doubled-sided plating) for shielding of EMI/RFI. This metallization may also be physically contacted to a ground plane formed on surface 13 of substrate 12 by conventional means (metallic springs, for example). Shell pieces 72 and 74 may be joined together using an ultrasonic weld, or snap fit together with bayonet catches, as is well known in the art. After shell pieces 72 and 74 are joined, the populated silicon substrate 12 may be encapsulated (or potted) to provide further environmental resistance.

The clam-shell arrangement as shown in FIG. 14 may be, in most cases, a preferred embodiment, since the molds used to manufacture clam shell piece parts 72, 74 would be less complex than the mold required to overmold the assembly as shown in FIG. 10. In particular, during an exemplary overmolding process, leads 16 and fiber ferrule receptacles 50, 52 and any mounting posts must be clamped in place to limit motion and confine the flow of resin. Receptacles 50, 52 must be clamped on their outer surfaces, thus no thermoset compound will enter their respective bores. In particular, an overmolded assembly as illustrated in FIGS. 10 and 12 will require corepulls/clamps in the mold as as result of the undercuts introduced by flanges 58, as well as the mounting posts.

It is to be understood, as mentioned above, that the self-aligning and molding techniques of the present invention are applicable to virtually any optical design, such as the packaging of a single optical device and associated electronics. Conversely, the process maybe used to provide for the packaging of an array of optical components, such as an array of LEDs or photodiodes.

We claim:

1. An optical package comprising
   a silicon substrate defined as comprising a top major surface;
   a plurality of metallized bond pad sites formed on said top major silicon surface;
   at least one active optical device attached and electrically connected to said top major silicon surface;
   electronic circuitry attached to said top major silicon surface for operating said at least one active optical device;
   means for electrically connecting said electronic circuitry between the plurality of metallized bond pad sites and the at least one active optical device;
   a plurality of alignment fiducials formed in said top major silicon surface at predetermined locations with respect to the location of said at least one active optical device;
   optical receptacle means for providing coupling between an optical fiber and said at least one active optical device, said optical receptacle means including alignment fiducials which mate with said optical device alignment fiducials upon attachment and provide optical alignment between said at least one active optical device and said optical receptacle means; and
   outer packaging formed so as to completely enclose said silicon substrate and a portion of said optical receptacle means.

2. An optical package as defined in claim 1 wherein the optical receptacle means includes a coupling lens and a fiber ferrule receptacle, said coupling lens positioned within an axial bore formed in said fiber ferrule receptacle.

3. An optical package as defined in claim 2 wherein the optical receptacle means further comprises an optical connector receptacle and the fiber ferrule receptacle includes an outer flange for mating with said optical connector receptacle.

4. An optical package as defined in claim 2 wherein the optical receptacle means further comprises a lens holder including the plurality of alignment fiducials for supporting said coupling lens and mating with the plurality of fiducials formed on the silicon top major surface.

5. An optical package as defined in claim 1 wherein the at least one active optical device includes coplanar n-type and p-type electrical contact regions disposed in a spaced-apart relationship on a first major surface of said at least one active optical device, said first major surface being physically attached and electrically connected to the silicon top major surface.

6. An optical package as defined in claim 1 wherein the at least one active optical device comprises a pair of optical devices.

7. An optical package as defined in claim 6 wherein the package comprises an optical transceiver and the pair of optical devices comprises an LED and photodiode.

8. An optical package as defined in claim 1 wherein the alignment fiducials comprise a plurality of pyramidal detents etched in silicon, with a like plurality of spherical members disposed therebetween to provide attachment.

9. An optical package as defined in claim 1 wherein the at least one optical device is self-aligned to bond pad sites formed on the top major surface of the silicon substrate.

10. A method for packaging an optical communication arrangement, the method comprising the steps of:
    a) providing a silicon substrate, including a dielectric surface layer, and defined as comprising a top major surface;
    b) forming alignment fiducials at predetermined locations on said top major surface of said silicon substrate;
    c) metallizing said silicon top major surface so as to define electrical signal paths and solder bump connection sites;
    d) providing electronic circuits and optical components which include electrical connection sites on the undersides thereof;
    e) placing the electronic circuits and optical components provided in step d) on said silicon top major surface;
    f) heating the arrangement of step e) to a temperature sufficient to cause the solder bumps to re-flow and provide electrical and physical coupling of the electronic circuits and optical components to said silicon substrate;
    g) providing optical receptacle means which functions to provide coupling between an optical fiber and said optical components, said optical receptacle means including alignment fiducials which mate with the alignment fiducials formed in step b);
    h) attaching said optical receptacle means to said substrate so as to provide physical attachment of the aligned fiducials and optical alignment between said optical components and said optical receptacle means; and
    i) enclosing the arrangement of step h) to provide a packaged optical communication arrangement.

11. The method according to claim 10 wherein in performing step i), a two-piece shell is used to enclose the arrangement.

12. The method according to claim 11 wherein the two-piece shell comprises a metallized underside which contacts a ground plane on the silicon substrate upon enclosure.

13. The method according to claim 10, the method comprising the further step of attaching an optical fiber connector receptacle to the package of step i).

* * * * *